US007128293B2

(12) United States Patent
Isley

(10) Patent No.: US 7,128,293 B2
(45) Date of Patent: Oct. 31, 2006

(54) HELICOPTER

(76) Inventor: Reggald Emory Isley, 9024-108th Street, Grande Prairie, AB (CA) T8V 4C8

( * ) Notice: Subject to any disclaimer, the term of this patent is extended or adjusted under 35 U.S.C. 154(b) by 265 days.

(21) Appl. No.: 10/726,573

(22) Filed: Dec. 4, 2003

(65) Prior Publication Data

US 2005/0151005 A1 Jul. 14, 2005

(51) Int. Cl.
*B64C 27/52* (2006.01)
(52) U.S. Cl. ................. 244/17.25; 244/12.4; 244/17.27
(58) Field of Classification Search ............ 244/17.25, 244/17.23, 17.11, 12.4, 17.19, 17.27
See application file for complete search history.

(56) References Cited

U.S. PATENT DOCUMENTS

| 2,486,059 | A | | 10/1949 | Pentecost | |
|---|---|---|---|---|---|
| 3,722,830 | A | | 3/1973 | Barber | 244/17.23 |
| 4,912,999 | A | | 4/1990 | Franks et al. | 74/417 |
| 5,370,341 | A | | 12/1994 | Leon | 244/17.11 |
| 5,377,934 | A | | 1/1995 | Hill | |
| 5,740,987 | A | * | 4/1998 | Morris et al. | 244/17.25 |
| 5,791,592 | A | | 8/1998 | Nolan et al. | 244/17.11 |
| 6,182,923 | B1 | | 2/2001 | Weinhart | 244/17.25 |
| 6,293,492 | B1 | | 9/2001 | Yanagisawa | 244/17.25 |
| 6,460,802 | B1 | | 10/2002 | Norris | 244/17.11 |
| 2002/0125368 | A1 | * | 9/2002 | Phelps et al. | 244/17.23 |

FOREIGN PATENT DOCUMENTS

| CA | 2061823 | | 2/1992 | |
|---|---|---|---|---|
| JP | 403021593 A | * | 1/1991 | 244/17.25 |
| WO | WO02/062661 A1 | | 8/2002 | |

OTHER PUBLICATIONS

International Search Report for PCT/CA2004/002060 dated Jan. 2004, International Searching Authority, May 12, 2006, pp. 1-3.

* cited by examiner

*Primary Examiner*—Timothy D. Collins
(74) *Attorney, Agent, or Firm*—Oyen Wiggs Green & Mutala LLP

(57) ABSTRACT

A helicopter has a power unit supported on an arch support member above an airframe. The power unit may be moved forward and rearward by a trim actuator to trim the helicopter and tilted about pitch and roll axes by control actuators for directional control. The control actuators may form a parallelogram linkage with the arms of the arch support member. Each control actuator may comprise a hydraulic cylinder having two cavities and a pair of pistons which further divide each cavity into a pair of volumes. The arch support member and landing gear assemblies may connect to transversely extending struts. The landing gear assemblies may be designed to progressively deform in case of a high impact landing.

29 Claims, 5 Drawing Sheets

HELICOPTER

TECHNICAL FIELD

This application relates to helicopters. The invention has particular application to coaxial rotor helicopters and helicopters in which directional control is accomplished at least in part by shifting a center of gravity relative to a center of lift.

BACKGROUND

Current helicopters and other vertical take-off aircraft are extremely complicated and maintenance intensive. As a result, it is often prohibitively expensive to fly helicopters. In practice the use of helicopters is limited to government and commercial operations in which their capabilities are indispensable. Despite their desirable flight characteristics, helicopters are rarely used in general aviation.

Helicopters have captured human imagination since prior to the first successful airplanes. As a result, there have been a variety of proposed helicopter designs. Many of these proposed designs are impractical. Various patents and published patent applications disclose helicopter designs. These include:
- U.S. Pat. No. 6,460,482 which discloses a helicopter having two rotors driven coaxially. The rotors can be tilted relative to an airframe of the helicopter.
- U.S. Pat. No. 5,791,592 which discloses another tilting coaxial rotor helicopter design.
- U.S. Pat. No. 5,370,341 which discloses an ultra lightweight helicopter having coaxial rotors that a pilot can manoeuver by moving his or her center of gravity.
- U.S. Pat. No. 5,791,592 which discloses a coaxial rotor helicopter with no tail rotor.
- U.S. Pat. No. 6,293,492 which discloses a helicopter having coaxial rotors that can be tilted for directional control.
- U.S. Pat. No. 4,912,999 which discloses a helicopter having a transmission and rotors that can be tilted for directional control.
- U.S. Pat. No. 2,486,059 which discloses a lightweight helicopter having coaxial rotors.
- U.S. Pat. No. 6,182,923 which discloses a helicopter having a rotor and power assembly that is slidable in one direction and pivotal in another.
- U.S. patent application publication No. 20020125368 which discloses an ultralight helicopter having tilting rotors.
- U.S. Pat. No. 3,722,830 which discloses a helicopter type vehicle having coaxial rotors in which steering is accomplished by shifting a center of gravity of the vehicle.
- PCT patent application publication No. WO02/062661A1 which discloses a lightweight helicopter.

Despite the wide variety of existing helicopters and proposed helicopter designs, there exists a need for practical helicopters which avoid at least some disadvantages of the prior art. There is a particular need for practical helicopters which are suitable for general aviation use and for practical helicopters having sizes intermediate proposed one-person personal helicopters and larger commercial helicopters.

SUMMARY OF THE INVENTION

This invention has a number of aspects. One aspect of the invention provides a helicopter having a power unit which can be tilted relative to an airframe to provide directional control. The power unit may comprise a pair of coaxial rotors. Another aspect of the invention provides a control system for controllably tilting a helicopter rotor. A still further aspect of the invention provides landing gear assemblies suitable for use in small helicopters.

In accordance with one embodiment of the invention, a helicopter comprises a power unit having at least one rotor and an engine coupled to drive the rotor. An airframe is suspended from the power unit with a pivotal coupling for pivoting about pitch and roll axes relative to the power unit. A plurality of control actuators are coupled between the airframe and the power unit. The control actuators are adjustable to set pitch and roll angles of the airframe relative to the power unit.

Preferably, the pitch and roll axes intersect and the plurality of control actuators comprises left and right control actuators which are positioned symmetrically on either side of the roll axis at locations spaced rearwardly from the location at which the pitch and roll axes intersect.

The airframe may be coupled to the power unit by a support member. The airframe may be pivotally mounted to the support member for rotation about a trim axis parallel to the pitch axis. The helicopter may comprise a trim actuator, connected between the airframe and the support member, which is operable to move the power unit forward and rearward relative to the airframe. The support member may be arch-shaped.

The control actuators preferably comprise linear hydraulic actuators. Each such linear hydraulic actuator may comprise a cylinder housing having a bore divided into two hydraulic cavities and a piston rod which extends into the bore. The piston rod may comprises a pair of pistons, each of which is located in a corresponding one of the hydraulic cavities, to divide each hydraulic cavity into a pair of volumes.

A hydraulic controller connected to a source of hydraulic fluid may be provided. The hydraulic controller is preferably connected to supply hydraulic fluid to and remove hydraulic fluid from selected ones of the volumes to controllably move the piston rods relative to their associated cylinder housings. Simultaneous extension or retraction of both control actuators causes pivoting movement of the power unit relative to the airframe about the pitch axis. Simultaneous extension of one control actuator and retraction of the other control actuator causes pivoting movement of the power unit relative to the airframe about the roll axis.

One or more landing gear assemblies may be provided. Each landing gear assembly preferably comprises a bent tubular member having an upper end attached to the helicopter, a lower end, and a bent portion between the upper and lower ends. The bent portion may have a bore filled with a plug of a resilient material. Preferably, the landing gear assembly comprises a cross brace coupled between the upper and lower ends of the bent tubular member, wherein the cross brace comprises a first member slidably received in a second member.

Further aspects of the invention and features of specific embodiments of the invention are described below.

BRIEF DESCRIPTION OF THE DRAWINGS

In drawings which illustrate non-limiting embodiments of the invention.

DESCRIPTION

Figure 1:
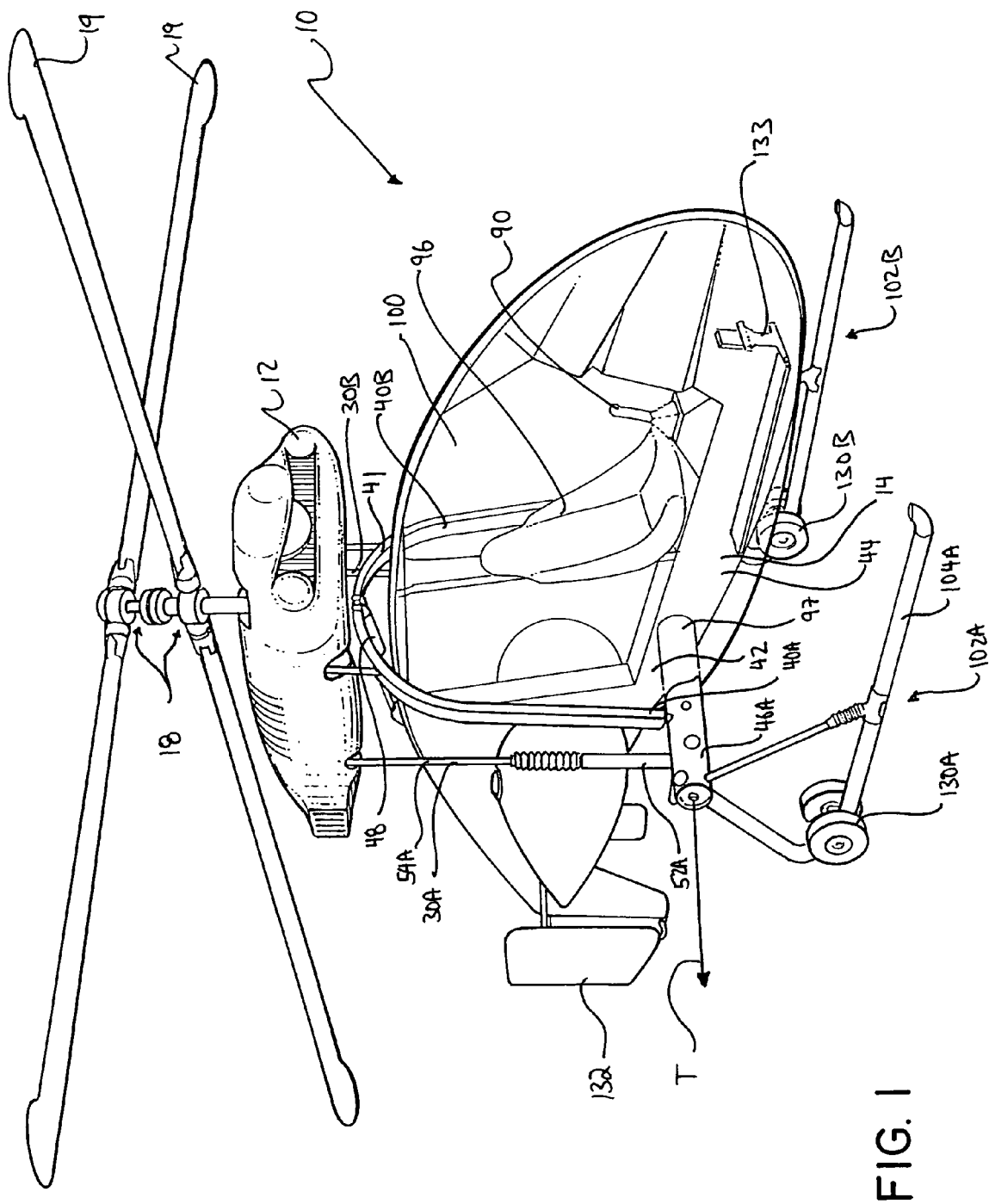
FIG. 1 is a perspective view of a helicopter according to a particular embodiment of the invention.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The preferred embodiments of the invention described herein incorporate a number of symmetric pairs of components. Such pairs of components may be referred to collectively using a single reference character (for example, engines 16). When referring specifically to an individual one of such pairs of components, the same reference character may be followed by the letter A or B as the case may be (for example, first engine 16A and second engine 16B).

Figure 2:
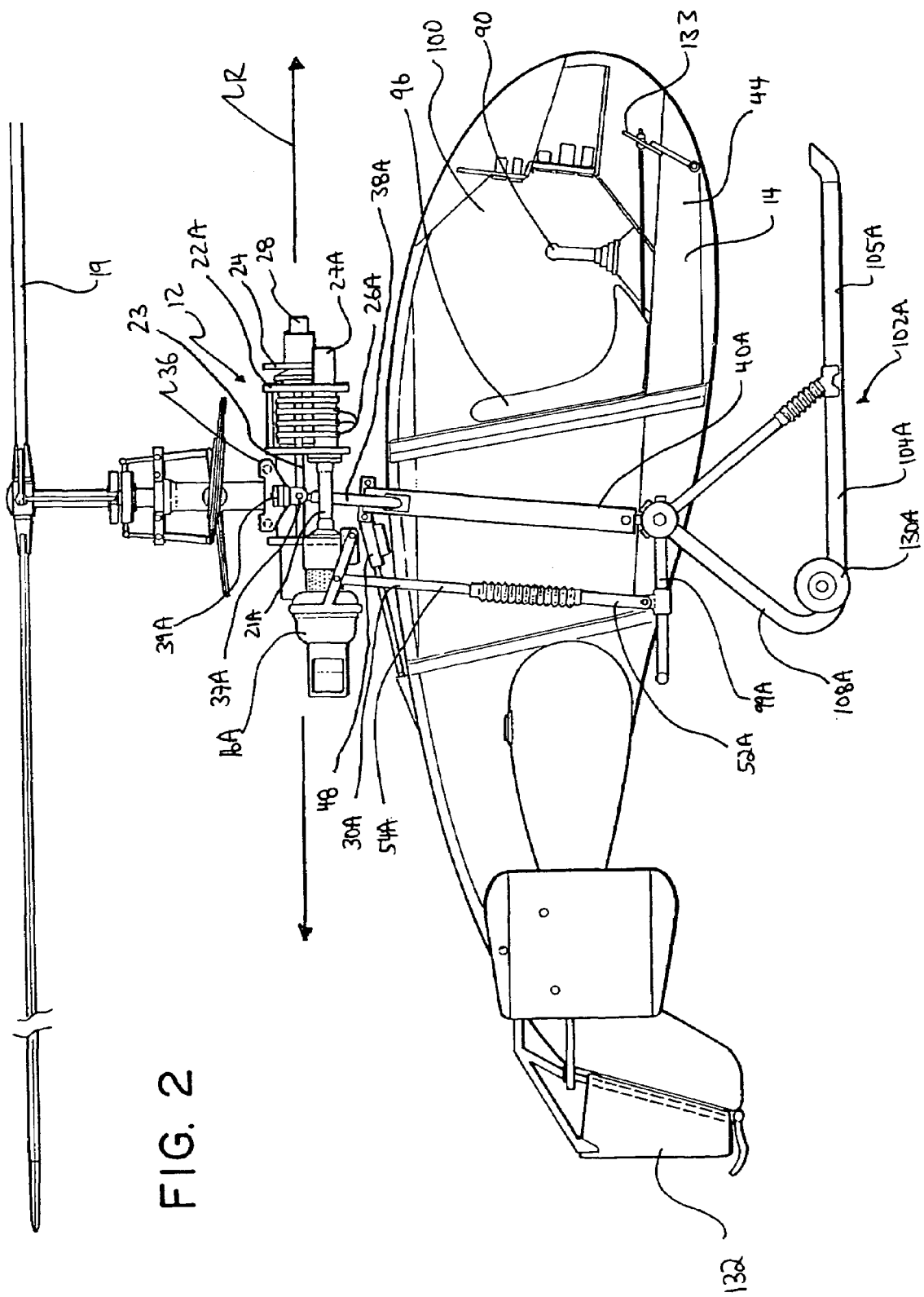
FIG. 2 is a right side elevational view of the helicopter of FIG. 1.
Figure 3:
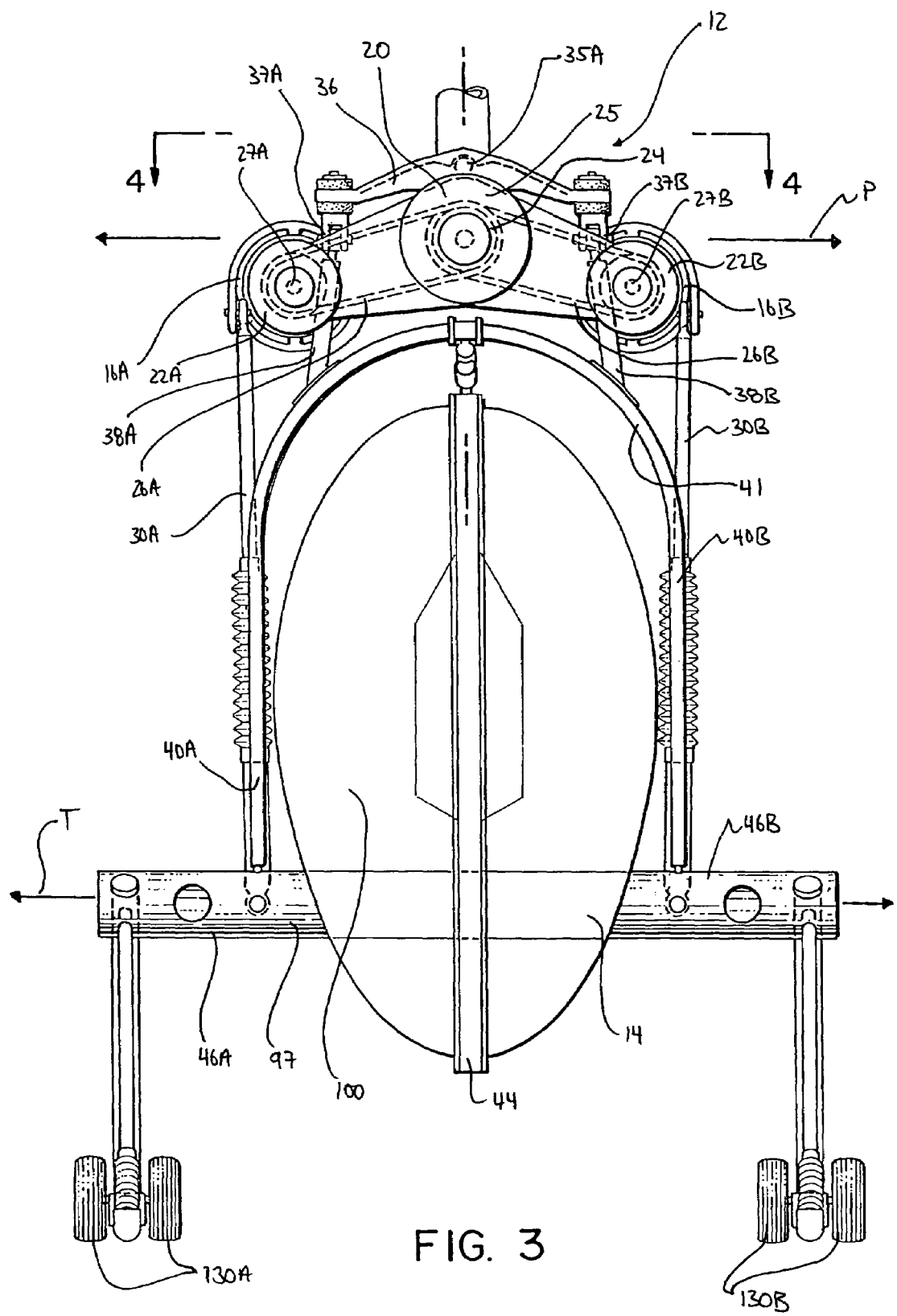
FIG. 3 is a front elevational view of the helicopter of FIG. 1.

FIGS. 1, 2 and 3 show a helicopter 10 according to one embodiment of the invention. In the illustrated embodiment, helicopter 10 is a small personal helicopter capable of carrying a pilot or a pilot plus one passenger. The invention is not limited to such small helicopters. Larger helicopters could also be made to incorporate aspects of the invention. Helicopter 10 has a power unit 12 and an airframe 14. As will be described in further detail below, airframe 14 is coupled to power unit 12 in a manner which permits power unit 12 to be pivoted relative to airframe 14 about a roll axis R and a pitch axis P (see FIGS. 2 and 3).

Power unit 12 comprises first and second engines 16A, 16B (FIGS. 2 and 3) coupled to drive a pair of counter-rotating rotors 18 which comprise blades 19. The pitch of blades 19 (i.e. the collective pitch) may be controlled using any suitable mechanism. A number of suitable mechanisms for controlling the collective pitch of helicopter rotor blades are known in the art.

In the illustrated embodiment, engines 16 are small jet turbine engines. Engines 16 are located symmetrically on either side of rotors 18. Engines 16 may comprise engines of the type known as auxiliary power units (APUs) or of the type known as ground power units (GPUs) on commercial jet airliners. Such engines may each generate in the range of a few horsepower to over 100 horsepower, for example. APUs and GPUs typically include integrated speed reducing transmissions.

Engines 16 drive rotors 18 by way of a transmission 20. In the illustrated embodiment, each engine 16A, 16B has an output shaft 21A, 21B which carries a corresponding sheave 22A, 22B. Transmission 20 has an input shaft 23 which carries a sheave 24 and a clutch 25 (FIG. 3). Engine sheaves 22 are coupled to transmission sheave 24 by a plurality of drive belts 26. Engines 16 drive corresponding magnetos 27.

In the illustrated embodiment, engines 16 also drive a hydraulic pump 28 which is coupled to shaft 23 of transmission 20.

A plurality of control actuators 30 are connected between power unit 12 and airframe 14 on either side thereof. In the illustrated embodiment, right and left control actuators 30A, 30B are located symmetrically on either side of roll axis R at positions spaced behind a location where pitch axis P and roll axis R cross one another. As explained further below, control actuators 30 can extend or retract to hold airframe 14 at desired angles of pitch and roll relative to power unit 12.

Figure 4:
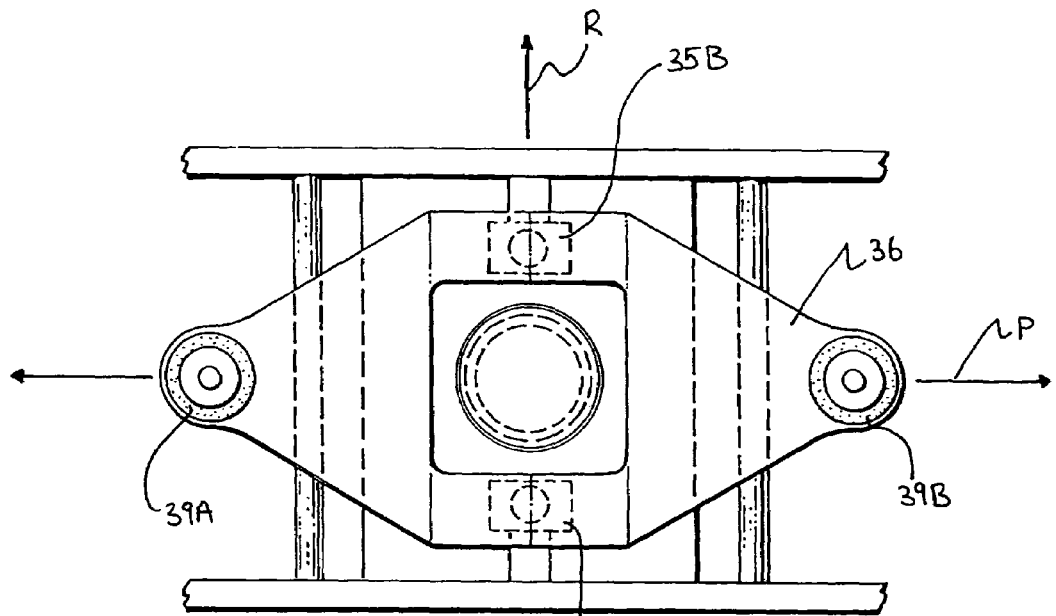
FIG. 4 is a top plan view of a portion of the coupling between the power unit and the airframe of the helicopter taken from the plane 4—4 shown in FIG. 3.

In the illustrated embodiment, power unit 12 is coupled to airframe 14 by way of a plate 36 (FIGS. 2 and 4), a pair of connecting members 38 and an arch support member 41. As shown best in FIG. 4, plate 36 is connected to power unit 12 at pivot joints 35, which permit power unit 12 to pivot relative to plate 36 about roll axis R. As shown best in FIGS. 2 and 3, connecting members 38 and arch support member 41 are suspended from plate 36 at pivot joints 37. Pivot joints 37 permit connecting members 38 and arch support member 41 to pivot about pitch axis P. Pivot joints 37 are preferably mounted to plate 36 by vibration-suppressing fittings 39. Pivot joints 35, 37 preferably comprise bearings.

Connecting members 38 are rigidly affixed to arch support member 41 which comprises downwardly extending arms 40. Airframe 14 comprises a main structural member 42 (FIG. 1) which is cruciate in shape and is made up of a longitudinally extending support member 44 and transversely extending struts 46. Preferably, as shown in the illustrated embodiment, transversely extending struts 46 are provided by opposed ends of a tubular member which extends from one side of helicopter 10 through to the other side. Arms 40 of arch support member 41 are connected to transversely extending struts 46 on either side of airframe 14. In the illustrated embodiment, arms 40 are pivotally connected to struts 46 and can be pivoted about a trim axis T (FIG. 3) which is parallel to pitch axis P.

The attitude of airframe 14 can be adjusted relative to arch support member 41 by extending or retracting a trim actuator 48 (FIG. 1). Trim actuator 48 may be an actuator similar to those used to control the flaps in some aeroplanes. In general, trim actuator 48 may comprise any suitable linear actuator. For example, trim actuator 48 may comprise a screw jack having a nut which can be driven in rotation about a fixed screw to extend or retract trim actuator 48, a hydraulic cylinder, a rack and pinion system a ratchet mechanism or the like.

In the illustrated embodiment, control actuators 30 extend approximately parallel to arms 40 of arch support member 41. Control actuators 30 and arms 40 provide an approximately parallelogram-shaped linkage. Power unit 12 can be moved forward or rearward relative to airframe 14 by extending or retracting trim actuator 48 and by suitable pivotal motion of arms 40 about trim axis T. The forward or rearward movement of power unit 12 by the extension or retraction of trim actuator 48 may be accomplished independently from the extension and/or retraction of control actuators 30.

Control actuators 30 may simultaneously and independently control the angle of airframe 14 relative to power unit 12 about both pitch axis P and roll axis R. The pitch of airframe 14 may be independently adjusted (i.e. without affecting the roll of airframe 14) by extending or retracting both of control actuators 30A, 30B by the same amount. The roll of airframe 14 may be independently adjusted (i.e. without affecting the pitch of airframe 14) by extending one of control actuators 30A, 30B and retracting the other one of control actuators 30B, 30A. Combinations of pitch and roll adjustment of airframe 14 relative to power unit 12 may also be provided by controlled extension and or contraction of control actuators 30A, 30B.

Figure 6:
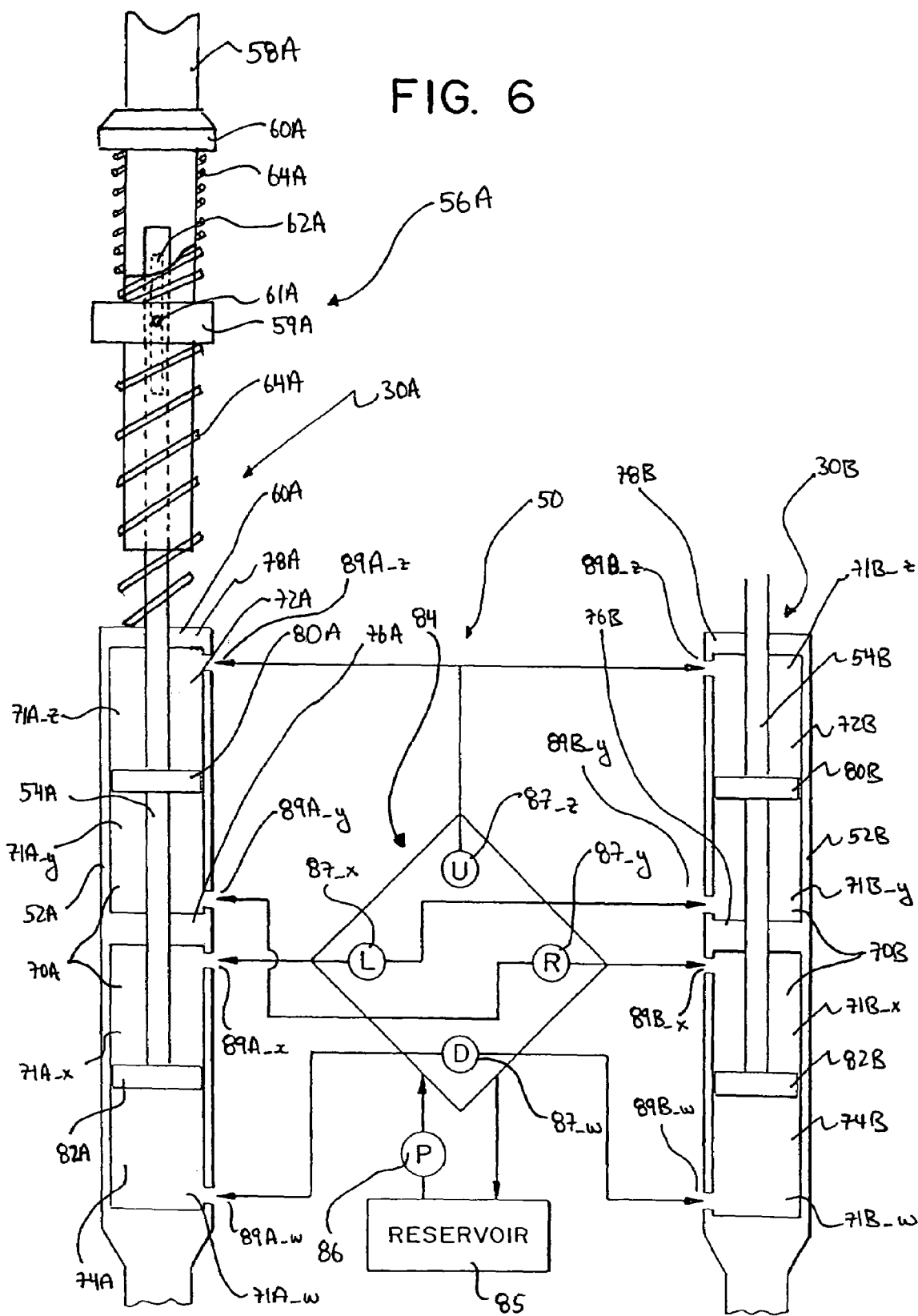

FIG. 6 schematically illustrates a construction of a control system 50 for controlling the movement of control actuators 30 according to one embodiment of the invention. Each control actuator 30A, 30B comprises a corresponding cylinder housing 52A, 52B which slidably receives a piston rod 54A, 54B. As shown best in FIGS. 1 and 2, the distal ends of piston rods 54 connect to power unit 12 and the distal ends of cylinder housings 52 connect to airframe 14. Piston rods 54 are biased toward a neutral position by centering mechanisms 56. FIG. 6 shows only centering mechanism 56A, it being understood that control actuator 30B comprises a centering mechanism having substantially the same components and operating in substantially the same manner as centering mechanism 56A. In the illustrated embodiment, piston rod 54A extends through a sleeve 58A. Block 59A is slidably disposed on the outside of sleeve 58A between stops 60. Block 59A is connected to piston rod 54A by pin 61A which extends through slot 62A. Centering mechanism 56A comprises a pair of springs 64A which are respectively compressed between block 59A and one of stops 60A.

As shown in FIG. 6, each cylinder housing 52A, 52B has a bore 70A, 70B divided into an upper hydraulic cavity 72A, 72B and a lower hydraulic cavity 74A, 74B by a divider 76A, 76B. Each bore 70A, 70B is closed by a corresponding plate 78A, 78B. Rods 54 pass through apertures in dividers 76 and plates 78. Pistons 80 and 82 are located respectively in upper cavities 72 and lower cavities 74 and are affixed to rods 54. Pistons 80 and 82 and dividers 76 divide bore 70A into four volumes 71A_w, 71A_x, 71A_y, 71A_z (collectively, volumes 71A) and divide bore 70B into four volumes 71B_w, 71B_x, 71B_y, 71B_z (collectively, volumes 71B).

Volumes 71A, 71B are filled with a hydraulic fluid such as a suitable grade of hydraulic oil. A hydraulic controller 84 permits the position of rods 54 to be controlled by introducing hydraulic fluid into and removing hydraulic fluid from selected ones of volumes 71A, 71B. Hydraulic controller 84 may comprise a pressure increasing valve. When hydraulic controller 84 is in a neutral configuration, volumes 71A, 71B are all connected to a hydraulic fluid reservoir 85, so that hydraulic fluid can flow freely into or out of each volume 71A_w, 71A_x, 71A_y, 71A_z, 71B_w, 71B_x, 71B_y, 71B_z.

A pump 86 provides pressurized hydraulic fluid to hydraulic controller 84. Hydraulic controller 84 comprises valves 87_w, 87_x, 87_y, 87_z (collectively, valves 87). Valves 87 are connected to volumes 71A, 71B through ports 89 as shown in Table I and illustrated schematically in FIG. 6.

TABLE I

Hydraulic Connections

| Valve | Volume (control actuator 30A) | Port (control actuator 30A) | Volume (control actuator 30R) | Port (control actuator 30B) |
|---|---|---|---|---|
| 87_w | 71A_w | 89A_w | 71B_w | 89B_w |
| 87_x | 71A_x | 89A_x | 71B_y | 89B_y |
| 87_y | 71A_y | 89A_y | 71B_x | 89B_x |
| 87_z | 71A_z | 89A_z | 71B_z | 89B_z |

Table I and FIG. 6 show that when hydraulic controller 84 is operated such that pressurized hydraulic fluid is supplied at valve 87_w and withdrawn at valve 87_z, then the pressurized hydraulic fluid will flow into volumes 71A_w, 71B_w and out of volumes 71A_z, 71B_z, so that both piston rods 54 will move upward and both control actuators 30 will extend. The extension of both control actuators 30 causes power unit 12 to pitch forward. During such an operation of hydraulic controller 84, volumes 71A_x, 71A_y, 71B_x, 71B_y are connected to reservoir 85, such that hydraulic fluid will be drawn into volumes 71A_y, 71B_y and expelled from volumes 71A_x, 71B_x as necessary to allow control actuators 30 to extend. If hydraulic controller 84 is operated so that pressurized hydraulic fluid is supplied at valve 87_z and withdrawn at valve 87_w, then the reverse occurs, causing both piston rods 54 to move downward, both control actuators 30 to retract and power unit 12 to pitch rearward.

If hydraulic controller 84 is operated so that pressurized hydraulic fluid is supplied at valve 87_x and withdrawn at valve 87_y, then, for control actuator 30A, the pressurized hydraulic fluid will flow into volume 71A_x and out of volume 71A_y. However, for control actuator 30B, the pressurized hydraulic fluid will flow into volume 71B_y and out of volume 71B_x. This movement of pressurized hydraulic fluid moves piston rod 54A downward causing control actuator 30A to contract, while piston rod 54B moves upward causing control actuator 30B to extend. The result is a rightward roll of power unit 12. During such an operation of hydraulic controller 84, volumes 71A_w, 71A_z, 71B_w, 71B_z are connected to reservoir 85, such that hydraulic fluid can flow into or out of volumes 71A_w, 71A_z, 71_w, 71B_z as necessary to allow actuators 30 to extend or retract. If hydraulic controller 84 is operated so that pressurized hydraulic fluid is supplied at valve 87_y and withdrawn at valve 87_x, then the reverse occurs and actuator 30A is extended while actuator 30B is retracted, resulting in a leftward roll of power unit 12.

A joystick 90 (FIGS. 1 and 2) may be provided to allow a pilot to control the operation of hydraulic controller 84 and to select a desired orientation of power unit 12. Joystick 90 may be connected directly to operate hydraulic controller 84. Alternatively, joystick 90 may be connected to hydraulic controller 84 by way of a suitable intermediate system, which may be mechanical, electronic or some combination of mechanical and electronic, for example. In a currently preferred embodiment of the invention, joystick 90 operates valve 84 directly. Pushing joystick 90 forward pitches power unit 12 forward. Pulling joystick 90 rearwardly pitches power unit 12 rearwardly. Pushing joystick 90 to the right rolls power unit 12 to the right and pushing joystick 90 to the left rolls power unit 12 to the left. Pushing joystick 90 in another direction results in moving power unit 12 through some combination of pitch and roll.

In the illustrated embodiment of the invention, airframe 14 comprises a longitudinally extending support member 44. Longitudinally extending support member 44 supports a pilot's seat 96 (FIGS. 1 and 2) and may optionally support a passenger's seat (not shown) located behind seat 96. Longitudinally extending support member 44 may comprise a beam formed from aluminum or another suitablly strong material having a cross-section which provides sufficient rigidity and is sufficiently light in weight.

As discussed above, transversely extending struts 46 may comprise ends of a tube 97 which passes through an aperture in longitudinally extending support member 44. Braces (not shown) may be provided between longitudinally extending support member 44 and transversely extending struts 46 to help maintain the perpendicular orientation of transversely extending struts 46 with respect to longitudinally extending support member 44. Arms 99 extend rearwardly from transversely extending struts 46 to support lower ends of control actuators 30.

A cockpit bubble 100 may be provided. Cockpit bubble 100 provides an enclosed space for a pilot and any passengers of helicopter 10. Cockpit bubble 100 may be formed from a suitable plastic such as Plexiglass™, for example. At least a front portion of cockpit bubble 100 is transparent. At least the outer ends of transversely extending struts 46 are located outside of cockpit bubble 100. Connecting members 38, arch support member 41, control actuators 30 and power unit 12 are also outside of cockpit bubble 100. Cockpit bubble 100 may be affixed along longitudinally extending support member 44.

Landing gear assemblies 102 are attached to corresponding outer ends of transversely extending struts 46. Landing gear assemblies 102 are preferably resiliently compressible, so that they may absorb normal shocks which may occur during landing of helicopter 10. Landing gear assemblies 102 are also preferably deformable in a manner which dissipates energy when they are subjected to greater shocks as might occur, for example, during a crash landing.

Figures 5, 5A:
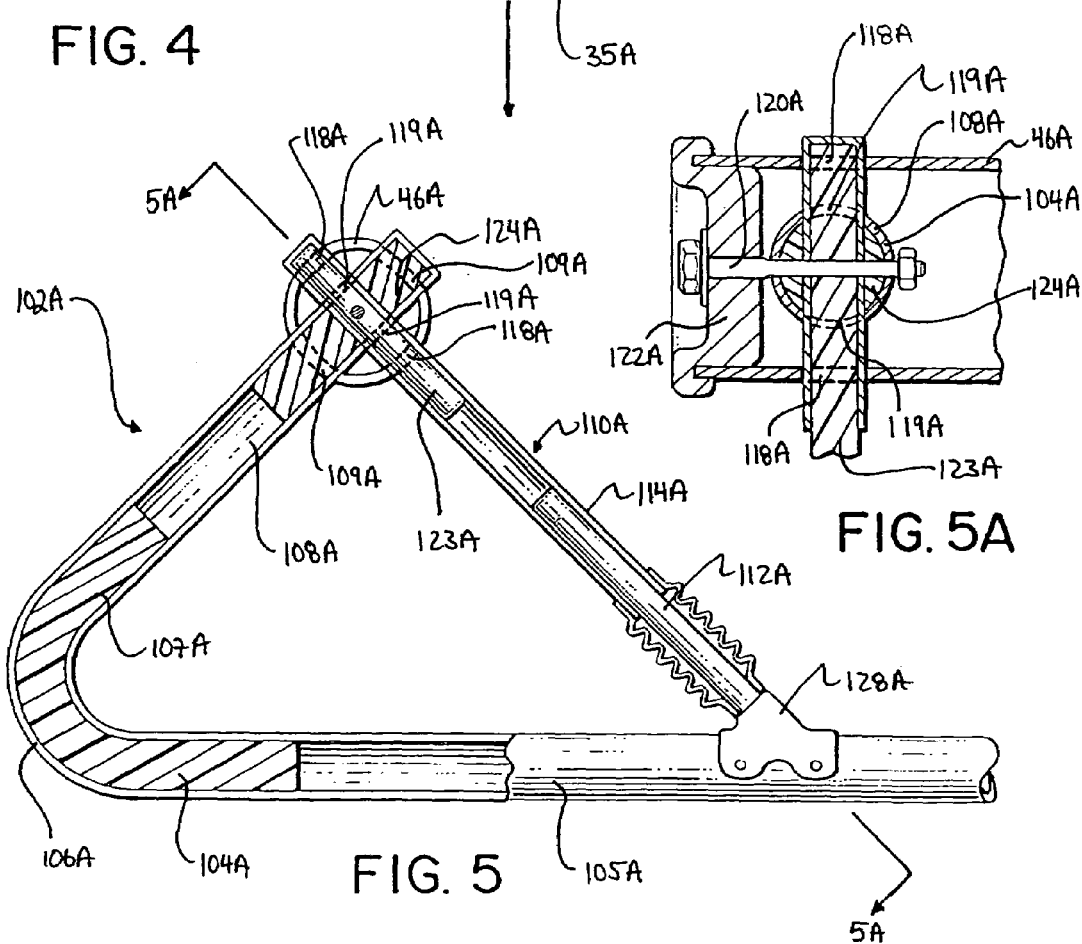
FIG. 5 is a partially cut away elevational view of a landing gear assembly of the helicopter of FIG. 1.
FIG. 5A is a sectional view through a portion of the landing gear assembly taken from the plane 5A—5A shown in FIG. 5; and, FIG. 6 is a schematic illustration of a hydraulic control system according to the invention.

FIG. 5 depicts a partially cut-away view of landing gear assembly 102A. Landing gear assembly 102A comprises a bent tube 104A. A lower portion 105A of tube 104A provides a landing skid. Tube 104A has a bend 106A, which may be reinforced by a reinforcing plug 107A. Reinforcing plug 107A may comprise a deformable plastic material such as nylon or the like having a diameter which matches an inner diameter of the bore of tube 104A. Reinforcing plug 107A may be introduced into tube 104A before tube 104A is bent. Tube 104A may comprise any suitable material. In one example embodiment, tube 104A comprises a 6061 T6 aluminum tube which has been annealed in the vicinity of bend 106A.

An upper end 108A of tube 104A is fastened to transversely extending strut 46A. In the illustrated embodiment of the invention, upper end 108A of tube 104A passes through holes 109A in the wall of transversely extending strut 46A. Holes 109A are preferably located such that the central axis of the upper end 108A of tube 104A intersects generally with the central axis of transversely extending strut 46A. A cross brace 110A extends between upper and lower portions 108A, 105A of tube 104A. Cross brace 110A may deform as described below under flexing of tube 104A.

In the illustrated embodiment, cross brace 110A comprises a first member 112A which is slidably received by a second member 114A. Members 112A and 114A are preferably round tubes. The outer diameter of member 112A fits slidably into the inner diameter of member 114A. When tube 104A is in its unloaded state, members 112A and 114A of cross brace 110A are generally aligned with one another.

As shown in FIGS. 5 and 5A, member 114A may be connected to upper end 108A of tube 104A and/or to transversely extending strut 46A. In the illustrated embodiment, member 114A passes through holes 118A in transversely extending strut 46A and holes 119A in the upper end 108A of tube 104A. Preferably holes 118A and 119A are located so that the central axis of member 114A intersects generally with the central axes of both transversely extending strut 46A and the upper end 108A of tube 104A. Preferably, tube 104A, strut 46A and member 114A intersect generally perpendicularly.

As shown in FIG. 5A, a bolt 120A passes through an end cap 122A on transversely extending strut 46A and through both tube 104A and member 114A. In the illustrated embodiment, bolt 120A extends axially with respect to transversely extending strut 46A. A solid plug 123A fills the bore of member 114A at the point where bolt 120A passes through it. A similar plug 124A fills the bore of tube 104A where member 114A and bolt 120A pass through it. Plugs 123A and 124A prevent tube 104A and member 114A from being significantly deformed by the pressure exerted by bolt 120A and also prevent dirt and moisture from entering the bores of tube 104A and member 114A. Plugs 123A and 124A may be made of any suitable material, such as nylon or aluminum, for example.

As discussed above, tube 104A is bent when it is in its unloaded state. If tube 104A begins to bend to a greater degree, then member 112A initially slides telescopically into member 114A. As the amount of bending of tube 104A increases, members 112A and 114A become misaligned. This increases the force required to telescopically slide member 112A into member 114A and causes energy to be dissipated. If the amount of bending of tube 104A increases even further, then member 112A will either bind in member 114A or contact the end of plug 123A. If bending forces continue to be applied to tube 104A, then either bolt 120 will shear or tube 104 will buckle. Bolt 120A, tube 104A and other parts of landing gear assembly 102A may be designed to progressively dissipate a desired amount of energy as landing gear assembly 102A collapses under abnormal impacts. Thus, landing gear assembly 102A provides a structure which progressively absorbs energy as force is applied to lower portion 105A of tube 104A.

Member 112A may be connected to lower portion 105A of tube 104A in any suitable manner. In the illustrated embodiment, member 112A is coupled to a fitting 128A which is in turn affixed to lower portion 105A. As shown in FIG. 1, wheels 130A may be provided on lower portion 105A of tube 104A to facilitate movement of helicopter 10 along the ground.

Helicopter 10 also includes a similar landing gear assembly 102B on its opposing side. Landing gear assembly 102B comprises similar components to landing gear assembly 102A depicted in FIGS. 5 and 5A and described above. Such components of landing gear assembly 102B include: a bent tube having an upper portion and a lower portion; a cross brace having telescopically slidable members; plugs for the tubes and cross brace members; and wheels. The bent tube and cross brace of landing gear assembly 102B may be mounted to transversely extending strut 46B in the same manner as landing gear assembly 102A is mounted to transversely extending strut 46A. It will be appreciated that the components of landing gear assembly 102B may function in a manner similar to the components of landing gear assembly 102A described above.

It can be seen that landing gear assemblies 102A, 102B, arch support 41 and power unit 12 are all connected to one or more of transversely extending struts 46A, 46B. Transversely extending struts 46 may comprise a single tube 97 which provides a common connection member for these structures. When helicopter 10 is on the ground, the weight of power unit 12 is supported by arch support member 41 and landing gear assemblies 102. Advantageously, parts of airframe 14 other than tube 97 do not need to bear the weight of power unit 12.

In operation, helicopter 10 can be caused to lift off by increasing the collective pitch of rotors 18 and applying power to engines 16 to turn rotors 18 in counter rotation. Trim actuator 48 may be operated to place the center of gravity of helicopter 10 directly under the lift point of rotors 18 under hover conditions. Helicopter 10 can be caused to rotate to face in a different direction by altering the pitch of one of rotors 18. Helicopter 10 can be caused to move in a desired direction by tilting power unit 12 in the desired direction as described above.

During forward flight, the yaw of helicopter 10 can be controlled by adjusting air foil 132 (FIGS. 1 and 2). Air foil 132 may be operated by foot pedal 133, for example.

Those skilled in the art will appreciate that this invention has various aspects which can advantageously be used together. These aspects of the invention can also be used individually. For example, landing gear assemblies 102, as described above, may be used in any suitably sized helicopter. A hydraulic control system 50 incorporating control actuators 30, as described above, may be used in contexts other than those described above.

As will be apparent to those skilled in the art in the light of the foregoing disclosure, many alterations and modifications are possible in the practice of this invention without departing from the spirit or scope thereof. For example:

- the illustrated embodiment of the invention employs a pair of control actuators 30. Additional control actuators may be provided;
- the construction of air frame 14 may be varied. For example, longitudinally extending member 44 and transversely extending struts 46 may be replaced with a generally planar horizontal base member;
- joystick 90 may be replaced by other devices for controlling the control actuators of hydraulic control system 50.

Accordingly, the scope of the invention is to be construed in accordance with the substance defined by the following claims.

What is claimed is:

1. A helicopter comprising:
   a power unit comprising at least one rotor and an engine coupled to drive the rotor;
   an airframe suspended from the power unit, the airframe pivotally coupled to the power unit for pivoting about pitch and roll axes relative to the power unit; and,
   a plurality of control actuators coupled between the airframe and the power unit, the control actuators adjustable to set pitch and roll angles of the airframe relative to the power unit;
   wherein the plurality of control actuators comprises left and right control actuators positioned symmetrically on either side of the roll axis at locations spaced rearwardly from a location at which the pitch and roll axes intersect.

2. A helicopter comprising:
   a power unit comprising at least one rotor and an engine coupled to drive the rotor;
   an airframe suspended from the power unit, the airframe pivotally coupled to the power unit for pivoting about pitch and roll axes relative to the power unit; and,
   a plurality of control actuators coupled between the airframe and the power unit, the control actuators adjustable to set pitch and roll angles of the airframe relative to the power unit;
   wherein the airframe is coupled to the power unit by a support member, the airframe is pivotally mounted to the support member for rotation about a trim axis parallel to the pitch axis, and the helicopter comprises a trim actuator connected between the airframe and the support member, the trim actuator operable to move the power unit forward and rearward relative to the airframe.

3. A helicopter according to claim 2 wherein the trim actuator comprises a linear actuator which is controllably extendable and retractable to adjust an angle of the airframe relative to the support member.

4. A helicopter according to claim 2 wherein the support member is arch-shaped and comprises a pair of downwardly extending arms and wherein the airframe is pivotally coupled to each of the arms.

5. A helicopter according to claim 4 wherein the airframe comprises a longitudinally extending support member and a pair of transversely extending struts which project from either side of the longitudinally extending support member and wherein the arms are each coupled to one of the transversely extending struts.

6. A helicopter according to claim 5 wherein the transversely extending struts are provided by a cylindrical tubular member which penetrates the longitudinally extending support member.

7. A helicopter according to claim 4 wherein each of the arms connects to a corresponding strut which projects transversely from one side of the airframe.

8. A helicopter according to claim 7 comprising a cockpit located between the arms.

9. A helicopter according to claim 1 wherein the control actuators each comprise a linear actuator.

10. A helicopter according to claim 9 wherein the control actuators each comprise a self-centering mechanism.

11. A helicopter according to claim 9 wherein the linear actuators each comprise a hydraulic actuator.

12. A helicopter according to claim 11 wherein each hydraulic actuator comprises:
    a cylinder housing having a bore divided into two hydraulic cavities; and
    a piston rod which extends into the bore of the cylinder housing, the piston rod comprising a pair of pistons, each of which is located in a corresponding one of the hydraulic cavities, to divide each hydraulic cavity into a pair of volumes.

13. A helicopter according to claim 12 comprising a hydraulic controller connected to a source of hydraulic fluid, the hydraulic controller connected to supply hydraulic fluid to and remove hydraulic fluid from selected ones of the the volumes to controllably move the piston rods relative to their associated cylinder housings.

14. A helicopter according to claim 13 wherein the hydraulic controller is controllable to cause simultaneous extension or simultaneous retraction of both control actuators, resulting in a pivoting movement of the power unit relative to the air frame about the pitch axis.

15. A helicopter according to claim 13 wherein the hydraulic controller is controllable to cause simultaneous extension of one control actuator and retraction of the other control actuator, resulting in a pivoting movement of the power unit relative to the air frame about the roll axis.

16. A helicopter according to claim 1 wherein the power unit comprises first and second engines symmetrically located on either side of the roll axis.

17. A helicopter according to claim 16 wherein the first and second engines comprise jet turbine engines.

18. A helicopter according to claim 17 wherein the first and second engines are coupled to turn the rotor by way of a transmission and each of the first and second engines is coupled to the transmission by a belt drive.

19. A helicopter according to claim 18 wherein the transmission is located between the first and second engines.

20. A helicopter according to claim 1 wherein the airframe comprises a longitudinally extending support member which supports a front seat and a rear seat located behind the front seat.

21. A helicopter according to claim 20 comprising a cockpit bubble attached to the longitudinally extending support member and surrounding the front and rear seats.

22. A helicopter according to claim 1 comprising a landing gear assembly which comprises a bent tubular member having an upper end attached to the helicopter, a lower end, and a bent portion between the upper and lower ends, the bent portion having a bore filled with a plug of a resilient material.

23. A helicopter according to claim 22 wherein the landing gear assembly comprises a cross brace coupled between the upper and lower ends of the bent tubular member, the cross brace comprising a first member slidably received in a second member.

24. A helicopter according to claim 23 wherein the second member is tubular and the first member is received in a bore of the second member.

25. A helicopter according to claim 24 comprising a plug secured within the bore of the second member, wherein, upon excessive compression of the bent tubular member, an end of the first member comes into contact with an end of the plug.

26. A helicopter according to claim 22 wherein the airframe comprises a transversely extending strut and the upper end of the bent tubular member passes through holes in the transversely extending strut.

27. A helicopter according to claim 26 wherein the landing gear assembly comprises a cross brace coupled between the upper and lower ends of the bent tubular member and wherein an upper end of the cross brace passes through holes in the transversely extending strut and the upper end of the bent tubular member.

28. A helicopter according to claim 27 wherein the upper end of the bent tubular member and the upper end of the cross brace intersect the transversely extending strut at right angles.

29. A helicopter according to claim 28 comprising an end cap on the transversely extending strut and a bolt extending through the end cap, the upper end of the bent tubular member and the upper end of the cross brace.

* * * * *